(12) United States Patent
Wu

(10) Patent No.: US 10,866,356 B2
(45) Date of Patent: Dec. 15, 2020

(54) BACKLIGHT MODULE HAVING RUBBER FRAME AND LIGHT GUIDE, DISPLAY PANEL AND DISPLAY HAVING THE SAME

(71) Applicants: Hefei BOE Display Lighting Co., Ltd., Anhui (CN); BOE TECHNOLOGY GROUP CO., LTD., Beijing (CN)

(72) Inventor: Chunsheng Wu, Beijing (CN)

(73) Assignees: Hefei BOE Display Lighting Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/414,507

(22) Filed: May 16, 2019

(65) Prior Publication Data

US 2020/0096696 A1  Mar. 26, 2020

(30) Foreign Application Priority Data

Sep. 21, 2018  (CN) .................... 2018 2 1552188 U

(51) Int. Cl.
F21V 8/00  (2006.01)

(52) U.S. Cl.
CPC ......... *G02B 6/0088* (2013.01); *G02B 6/0055* (2013.01)

(58) Field of Classification Search
CPC ............................ G02B 6/0088; G02B 6/0055
See application file for complete search history.

(56) References Cited

U.S. PATENT DOCUMENTS

| | | | | |
|---|---|---|---|---|
| 10,247,877 B2* | 4/2019 | Wu | ...................... | G02B 6/0055 |
| 10,473,974 B2* | 11/2019 | Feng | .................... | G02B 6/0011 |
| 2009/0303408 A1* | 12/2009 | Huang | .............. | G02F 1/133608 349/58 |
| 2011/0299296 A1* | 12/2011 | Lin | ..................... | H05K 7/20963 362/606 |
| 2013/0033657 A1* | 2/2013 | Li | ..................... | G02F 1/133615 349/60 |
| 2013/0044515 A1* | 2/2013 | Lu Feng | ................ | G02B 6/005 362/609 |
| 2013/0208208 A1* | 8/2013 | Li | ..................... | G02F 1/133308 349/58 |
| 2013/0265503 A1* | 10/2013 | Hosoki | ................ | G02B 6/0068 348/790 |
| 2014/0176864 A1* | 6/2014 | Yu | ........................ | G02B 6/0088 349/62 |
| 2015/0346541 A1* | 12/2015 | Ando | ................... | G02B 6/0065 362/606 |

\* cited by examiner

*Primary Examiner* — Tracie Y Green

(74) *Attorney, Agent, or Firm* — Thomas | Horstemeyer LLP

(57) ABSTRACT

The present disclosure provides a backlight module, and a display panel and a display having the same. The backlight module includes a back plate, a light guide plate, and a reflective sheet. The inner surface of a periphery of the back plate is concavely formed with a groove. The light guide plate is disposed on an inner surface of the back plate, and the reflective sheet is disposed on a bottom surface of the light guide plate facing towards the back plate. The backlight module further includes a spacer. The spacer is disposed between a bottom of the groove and the reflective sheet. A top surface of the spacer facing towards the reflective sheet is closer to the reflective sheet than the inner surface of the back plate, so that a gap is formed between the reflective sheet and the back plate.

17 Claims, 3 Drawing Sheets

BACKLIGHT MODULE HAVING RUBBER FRAME AND LIGHT GUIDE, DISPLAY PANEL AND DISPLAY HAVING THE SAME

CROSS-REFERENCE TO RELATED APPLICATIONS

The present application is based on and claims priority to Chinese Patent Application No. 201821552188.0, entitled "BACKLIGHT MODULE, DISPLAY PANEL AND DISPLAY HAVING THE SAME", filed on Sep. 21, 2018, the entire contents of which is incorporated herein by reference.

TECHNICAL FIELD

The present disclosure relates to the field of display devices, and in particular, to a backlight module, and a display panel and a display having the same.

BACKGROUND

As a key component of a display device, the backlight module is widely used in fields such as liquid crystal display. Due to the limitation of the machining process of the back plate, the surface of the back plate of the existing backlight module facing towards the light guide plate cannot be completely flat, and the local protrusion is easily generated. Moreover, in actual assembly, foreign objects between the back plate and the reflective sheet cannot be completely removed, and are often remained. In addition, during the assembly process, there is a contact force between the light guide plate and the back plate, and partial unevenness of the back plate and the foreign object particles may cause the backlight to produce picture defects such as a squeeze white and a point damage of foreign object. Also, the above-mentioned defect between the back plate and the light guide plate of the existing backlight module has a certain progress, so that it is challenging to be intuitively distinguished and intercepted during the production and transportation of the backlight source, which further causes a greater quality abnormality.

SUMMARY

According to an aspect of the present disclosure, a backlight module is provided. The backlight module includes a back plate, a light guide plate, and a reflective sheet. An inner surface of a periphery of the back plate is concavely formed with a groove. The light guide plate is disposed on the inner surface of the back plate, and the reflective sheet is disposed on a bottom surface of the light guide plate facing towards the back plate. The backlight module further includes a spacer. The spacer is disposed between a bottom of the groove and the reflective sheet. A top surface of the spacer facing towards the reflective sheet is closer to the reflective sheet than an inner surface of the reflective sheet, so that a gap is formed between the reflective sheet and the back plate.

According to one of arrangements of the present disclosure, there is a difference between a thickness of the spacer in a direction of a groove depth of the groove and the groove depth, and the difference is from 0.1 mm to 0.2 mm.

According to one of arrangements of the present disclosure, the spacer is made of silicone or foam rubber.

According to one of arrangements of the present disclosure, the backlight module further comprises a rubber frame disposed at a top surface of a periphery of the light guide plate. A periphery of the reflective sheet extends beyond the periphery of the light guide plate along a first direction, the rubber frame has a press portion that protrudes and extends towards the periphery of the reflective sheet, and an end of the press portion is pressed against the periphery of the reflective sheet.

According to one of arrangements of the present disclosure, the periphery of the reflective sheet is bent towards the back plate to form a pressure groove structure, and a notch of the pressure groove structure facing towards the press portion is pressed against a bottom of the pressure groove structure.

According to one of arrangements of the present disclosure, the peripheral of the reflective sheet is provided with a plurality of roulettes, and the pressure groove structure is formed by bending the reflective sheet along the plurality of roulettes.

According to one of arrangements of the present disclosure, the backlight module further includes an optical membrane material disposed at a surface of the light guide plate away from the reflective sheet.

According to another aspect of the present disclosure, a display panel is provided. The display panel includes a display module and a backlight module proposed by the present disclosure and described in the above arrangements, wherein the display module is stacked with the backlight module.

According to one of arrangements of the present disclosure, the display module and the backlight module are connected by a buffer rubber.

According to still another aspect of the present disclosure, a display is provided. The display includes the display panel proposed by the present disclosure and described in the above arrangements.

BRIEF DESCRIPTION OF THE DRAWINGS

The various objects, features and advantages of the present disclosure will become more apparent from the detailed description of the preferred arrangements of the present disclosure with reference to the accompanying drawings. The drawings are only illustrative of the present disclosure and are not necessarily to scale. In the drawings, like reference numbers generally refer to the same or similar components. In the drawings.

DETAILED DESCRIPTION

Figure 1:
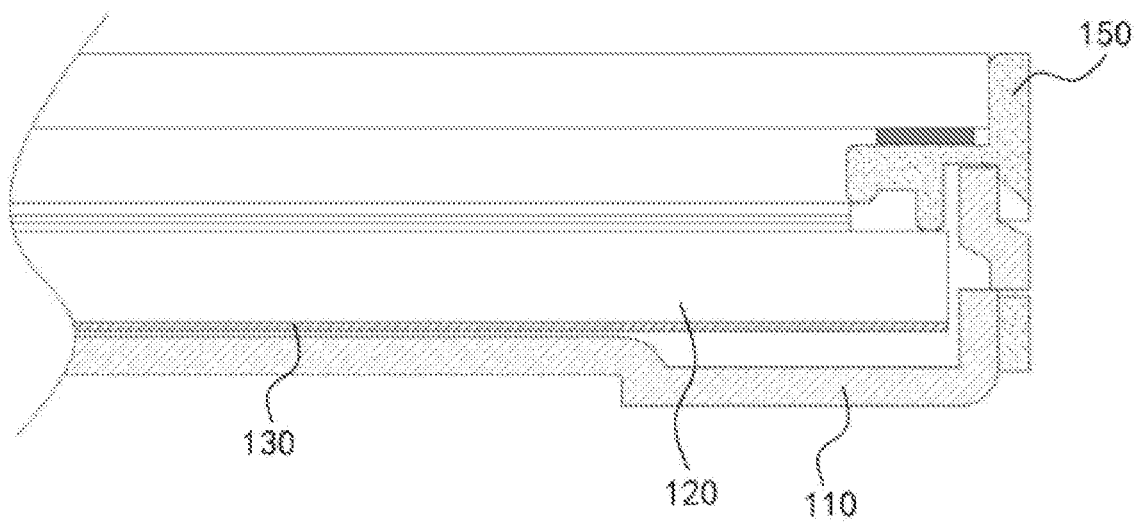
FIG. 1 representatively shows a partial cross-sectional view of a backlight module in the related art.

Exemplary arrangements embodying the features and advantages of the present disclosure will be described in detail in the following description. It should be understood that the present disclosure is capable of various modifications in the various arrangements without departing from the scope of the present disclosure, and the description and drawings thereof are intended to illustrate only and not limit the present disclosure.

The following description of the various exemplary arrangements of the present disclosure refers to the drawings, which constitute part of the present disclosure and show different exemplary structures, systems and blocks implementing various aspects of the present disclosure by way of example. It should be understood that other specific aspects of components, structures, exemplary devices, systems and blocks can be used, and structural and functional modifications can be made without departing from the scope of the present disclosure. Moreover, although the terms "upper", "top", "bottom", "between" or the like may be used in this specification to describe various exemplary features and elements of the present disclosure, these terms are used herein only for convenience, for example, the direction according to the example shown in the drawings. Nothing in this specification should be construed as requiring a specific three dimensional orientation of the structure to fall within the scope of the disclosure.

Referring to FIG. 1, a partial cross-sectional view of a backlight module in the related art is representatively shown. The related backlight module mainly includes a back plate 110, a light guide plate 120, a reflective sheet 130, and a rubber frame 150. Specifically, the light guide plate is disposed on the back plate 110, the reflective sheet 130 is disposed between the light guide plate 120 and the back plate 110, and the rubber frame 150 is disposed at a frame position of the back plate 110.

Backlight Module Implementation

Figure 2:
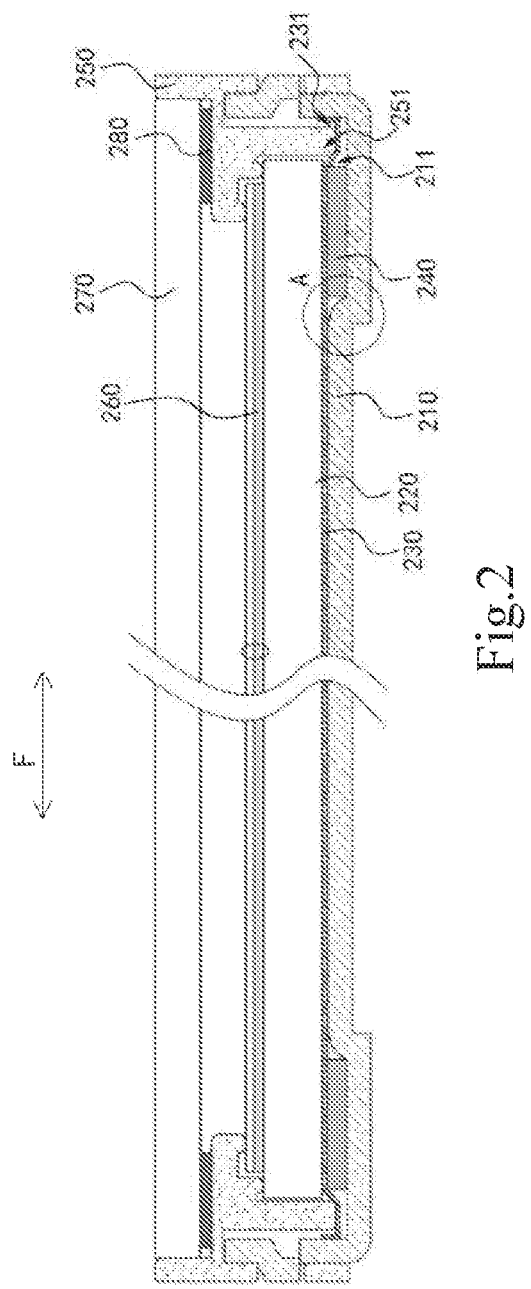
FIG. 2 is a cross-sectional view of a backlight module illustrated according to an exemplary arrangement of the present disclosure.

Referring to FIG. 2, a cross-sectional view of a backlight module proposed by the present disclosure is representatively shown. In the exemplary arrangement, the backlight module proposed by the present disclosure is exemplified by a backlight module applied to a display panel. It will be readily understood by those skilled in the art that various modifications, additions, substitutions, deletions or other variations are made to the specific arrangements described below in order to apply the related designs of the present disclosure to other types of display devices or other processes. These variations are still within the scope of the principles of the backlight module provided by the present disclosure.

Figure 3:
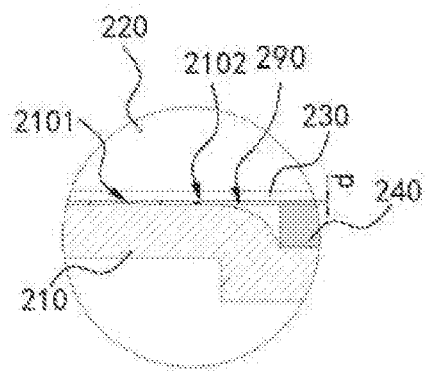
FIG. 3 is an enlarged view of a portion A of FIG. 2.
Figure 4:
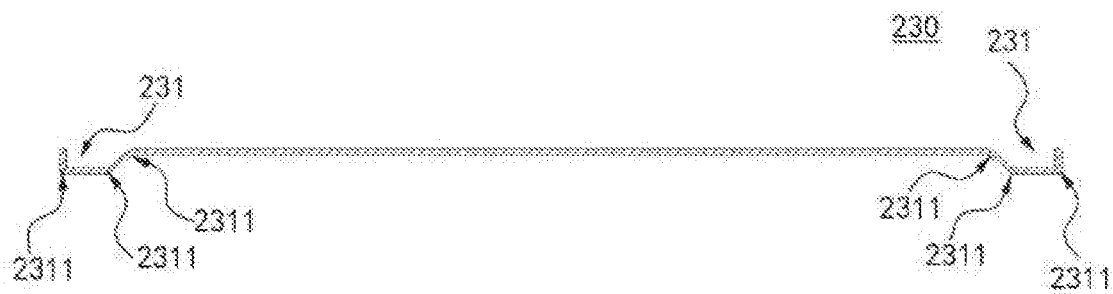
FIG. 4 is a cross-sectional view of a reflective sheet of the backlight module illustrated in FIG. 2.
Figure 5:
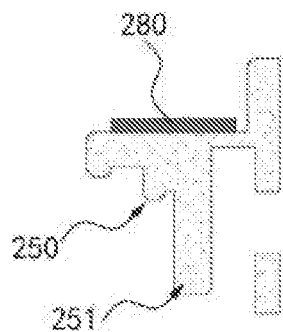
FIG. 5 is a cross-sectional view of a rubber frame of the backlight module illustrated in FIG. 2.

As shown in FIG. 2, in the present arrangement, the backlight module proposed by the present disclosure mainly includes a back plate 210, a light guide plate 220, a reflective sheet 230, a spacer 240, a rubber frame 250, an optical membrane material 260, and a display module 270. Referring to FIGS. 3 to 5, FIG. 3 is an enlarged view of a portion A of FIG. 2; FIG. 4 representatively shows a cross-sectional view of a reflective sheet 230 of a backlight module capable of embodying the principles of the present disclosure; and FIG. 5 representatively shows a cross-sectional view of the rubber frame 250 of a backlight module capable of embodying the principles of the present disclosure. The structure, connection mode and functional relationship of respective main components of the backlight module proposed by the present disclosure will be described in detail below with reference to the above drawings.

As shown in FIG. 2, in the present arrangement, the back plate 210, the reflective sheet 230, the light guide plate 220, and the optical membrane material 260 are sequentially stacked from bottom to top, and the display module 270 is disposed above the back plate 210 at intervals from the optical membrane material 260. Specifically, the optical membrane material 260 is disposed at the surface of the light guide plate 220 away from the reflective sheet. The rubber frame 250 is disposed at a frame position of the back plate 210 and the display module 270, and is partially disposed between the top surface of the periphery of the light guide plate 220 and the bottom surface of the periphery of the display module 270 to define a frame of the backlight module.

As shown in FIG. 2 and FIG. 3, in this arrangement, the inner surface of the periphery of the back plate 210 (i.e., the frame position of the back plate 210) is concavely formed with a groove 211, the light guide plate 220 is disposed on the inner surface of the back plate 210, and the reflective sheet 230 is disposed on the bottom surface of the light guide plate 220 facing towards the back plate 210. The spacer 240 is disposed between the bottom of the groove 211 and the reflective sheet 230. The top surface of the spacer 240 facing towards the reflective sheet 230 is closer to the reflective sheet 230 than the inner surface of the back plate 210, so that there is a gap 290 formed between the reflective sheet 230 and the back plate 210. Accordingly, the present disclosure utilizes the gap 290 formed between the reflective sheet 230 and the back plate 210 to avoid negative effects caused by protrusions 2101 on the back plate 210 and foreign particles 2102 existing between the back plate 210 and the reflective sheet 230, thus solving quality problems such as a squeeze white and a point damage of foreign object caused by the presence of the protrusion 2101 of the back plate 210 and the foreign object particles 2102 between the light guide plate 220 and the back plate 210, and at the same time, reducing the defective rate of the finished products and the scrap rate of the light guide plates 220.

Further, as shown in FIG. 3, in the present arrangement, since the top surface of the spacer 240 facing towards the reflective sheet 230 is closer to the reflective sheet 230 than the inner surface of the back plate 210, there is a difference d between a thickness of the spacer 240 in a direction of a groove depth of the groove 211 and the groove depth. The height of the protrusion 2101 of the back plate 210 and the size of the residual foreign particles 2102 are generally between 0.05 mm and 0.1 mm, so the spacer 240 needs to be about 0.1 mm higher than the inner surface of the back plate 210, and when considering the thickness of the backlight module and the shrinkage effect of the spacer 240, in one arrangement, the difference is between 0.1 mm and 0.2 mm. In other arrangements, considering the size of foreign particles 2102 remaining between the back plate 210 and the reflective sheet 230, or different design requirements, the difference d may be selected from other designs, and is not limited in this arrangement.

Further, in the present arrangement, the material of the spacer 240 is silicone. In other arrangements, other materials such as foam rubber may be selected for the spacer 240, which will not be limited thereto.

Further, as shown in FIG. 2 and FIG. 3, in the present arrangement, the periphery of the reflective sheet 230 extends beyond the periphery of the light guide plate 220 in a first direction F. The first direction in this arrangement is the horizontal direction shown in FIG. 2, i.e., the size of the reflective sheet 230 in the horizontal direction shown in FIG. 2 is larger than the size of the light guide plate 220. As shown in FIG. 5, the rubber frame 250 has a press portion 251 that protrudes and extends towards the periphery of the reflective sheet 230, and an end of the press portion 251 is pressed against the periphery of the reflective sheet 230. Accordingly, in consideration of the fact that materials of the light guide plate 220 and the reflective sheet 230 are soft, when two ends of the reflective sheet 230 are raised by the spacer 240, the middle position of the reflective sheet 230 may be deformed and sunk. In the present disclosure, the press portion 251 of the rubber frame 250 is pressed against the periphery of the reflective sheet 230, so that the reflective sheet is forced at the periphery to at least partially offset the force when the middle portion sinks, thus straightening the reflective sheet in the horizontal direction, and the light guide plate 220 and the optical membrane material on the top thereof is lifted up to further relieve the problem of deformation and sinking.

Further, as shown in FIG. 2 and FIG. 4, based on the design of the periphery of the reflective sheet 230 extending beyond the periphery of the light guide plate 220 in the first direction F, and the design of the press portion 251 being pressed against the periphery of the reflective sheet 230 in the rubber frame 250, in the present arrangement, the peripheral edge of the reflective sheet 230 is bent towards the back plate 210 to form the pressure groove structure 231. Wherein the notch of the pressure groove structure 231 faces towards the press portion 251, and the press portion 251 is pressed against the bottom of the pressure groove structure 231. Accordingly, the force on the peripheral of the light reflective sheet can further offset the force when the middle portion sinks, thus further straightening the light reflective sheet in the horizontal direction, further lifting up the light guide plate 220 and the optical membrane material on the top thereof, and further relieving the problem of deformation and sinking.

Further, as shown in FIG. 4, based on the design of the periphery of the reflective sheet 230 extending beyond the periphery of the light guide plate 220 in the first direction F, and the design of bending the periphery of the reflective sheet 230 towards the back plate 210 to form the pressure groove structure 231, in the present arrangement, the peripheral edge of the reflective sheet 230 is provided with a plurality of roulettes, so that the pressure groove structure 231 is formed by bending the reflective sheet 230 along the roulettes. The roulettes can be understood as pressing lines (dashed lines) at intervals on the reflective sheet 230. The position of the dashed line body is indented or the position of the dashed line body is cut off, which facilitates bending of the material of the reflective sheet 230.

It should be noted herein that the backlight modules shown in the drawings and described in this specification are just a few examples of the many types of backlight modules that can employ the principles of the present disclosure. It should be clearly understood that the principles of the present disclosure are not only limited to any details of the backlight module shown in the drawings or described in the specification, or any component of the backlight module.

Display Panel Implementation

Based on the above-described exemplary description of the backlight module proposed by the present disclosure, an exemplary arrangement of the display panel proposed by the present disclosure will be described below.

In the present arrangement, the display panel proposed by the present disclosure includes a display module 270 and a backlight module proposed by the present disclosure and described in detail in the above arrangements. The display module 270 is stacked with the backlight module.

Further, in the present arrangement, as shown in FIG. 2, the periphery of the display module and the periphery of the backlight module are connected by a buffer rubber 280.

The specific structure of the display module 270 can be obtained by those skilled in the art in the related art, so that the details thereof will not be repeated herein.

It should be noted herein that the display panels illustrated in the drawings and described in this specification are merely a few of the many types of display panels that can employ the principles of the present disclosure. It should be clearly understood that the principles of the present disclosure are not only limited to any details of the display panel shown in the drawings or described in the specification, or any component of the display panel.

Display Implementation

Based on the above-described exemplary description of the backlight module and the display panel proposed by the present disclosure, an exemplary arrangement of the display proposed by the present disclosure will be described below.

In the present arrangement, the display proposed by the present disclosure includes a display panel proposed by the present disclosure and explained in detail in the above arrangements.

It should be noted herein that the displays shown in the drawings and described in this specification are merely a few of the many types of displays that can employ the principles of the present disclosure. It should be clearly understood that the principles of the present disclosure are not only limited to any details of the display, or any component of the display shown in the drawings.

In summary, the backlight module, and the display panel and the display having the same are provided by the present disclosure. In the backlight module, a spacer is disposed between the bottom of the groove and the reflective sheet, and the top surface of the spacer facing towards the reflective sheet is closer to the reflective sheet than the inner surface of the back plate. Accordingly, the present disclosure can form a gap between the reflective sheet and the back plate, which can circumvent the local protrusion of the back plate and foreign object particles existing between the back plate and the reflective sheet, thus solving quality problems such as a squeeze white and a point damage of foreign object caused by the presence of the protrusion of the back plate and the foreign object particles between the light guide plate and the back plate, and at the same time, reducing the defective rate of the finished products and the scrap rate of the light guide plates.

Exemplary arrangements of the backlight module, and the display panel and the display having the same provided by the present disclosure are described and/or illustrated in detail above. However, arrangements of the present disclosure are not limited to the specific arrangements described herein, but rather, the components and/or blocks of each arrangement can be used independently and separately from the other components and/or blocks described herein. Each component and/or each block of an arrangement may also be used in combination with other components and/or blocks of other arrangements. When introducing elements/components/etc. described and/or illustrated herein, the terms such as "a", "an", "the" and "said" are used to indicate the presence of one or more elements/components. The terms "comprise", "include", "have", "contain" and their variants are used to be open-type and are meant to include additional elements/components, etc., in addition to the listed elements/components/etc.

While the backlight module, and the display panel and the display having the same proposed by the present disclosure have been described in terms of various specific arrangements, those skilled in the art will recognize that the implementation of the present disclosure can be modified within the spirit and scope of the claims.

What is claimed is:

1. A backlight module, comprising:
   a back plate, a first inner surface of a periphery of the back plate is concavely formed with a groove;
   a light guide plate disposed on a second inner surface of the back plate;

a reflective sheet disposed on a bottom surface of the light guide plate facing towards the back plate;

a spacer disposed between a bottom of the groove and the reflective sheet, a top surface of the spacer facing towards the reflective sheet being closer to the reflective sheet than the second inner surface of the back plate, so that a gap is formed between the reflective sheet and the back plate; and a rubber frame disposed at a top surface of a periphery of the light guide plate; wherein a periphery of the reflective sheet extends beyond the periphery of the light guide plate along a first direction, the rubber frame has a press portion that protrudes and extends towards the periphery of the reflective sheet, and an end of the press portion is pressed against the periphery of the reflective sheet.

2. The backlight module according to claim 1, wherein there is a difference between a thickness of the spacer in a direction of a groove depth of the groove and the groove depth, and the difference is from 0.1 mm to 0.2 mm.

3. The backlight module according to claim 1, wherein the spacer is made of silicone or foam rubber.

4. The backlight module according to claim 1, wherein the periphery of the reflective sheet is bent towards the back plate to form a pressure groove structure, and a notch of the pressure groove structure facing towards the press portion is pressed against a bottom of the pressure groove structure.

5. The backlight module according to claim 4, wherein the periphery of the reflective sheet is provided with a plurality of roulettes, and the pressure groove structure is formed by bending the reflective sheet along the plurality of roulettes.

6. The backlight module according to claim 1, wherein the backlight module further comprises:

an optical membrane material disposed at a surface of the light guide plate away from the reflective sheet.

7. A display panel, comprising a display module and a backlight module, wherein the display module is stacked with the backlight module;

wherein the backlight module comprises:

a back plate, a first inner surface of a periphery of which is concavely formed with a groove;

a light guide plate disposed on a second inner surface of the back plate;

a reflective sheet disposed on a bottom surface of the light guide plate facing towards the back plate;

a spacer disposed between a bottom of the groove and the reflective sheet, a top surface of the spacer facing towards the reflective sheet being closer to the reflective sheet than the second inner surface of the back plate, so that a gap is formed between the reflective sheet and the back plate; and a rubber frame disposed at a top surface of a periphery of the light guide plate; wherein a periphery of the reflective sheet extends beyond the periphery of the light guide plate along a first direction, the rubber frame has a press portion that protrudes and extends towards the periphery of the reflective sheet, and an end of the press portion is pressed against the periphery of the reflective sheet.

8. The display panel according to claim 7, wherein the display module and the backlight module are connected by a buffer rubber.

9. The display panel according to claim 7, wherein there is a difference between a thickness of the spacer in a direction of a groove depth of the groove and the groove depth, and the difference is from 0.1 mm to 0.2 mm.

10. The display panel according to claim 7, wherein the spacer is made of silicone rubber or foam rubber.

11. The display panel according to claim 7, wherein the periphery of the reflective sheet is bent towards the back plate to form a pressure groove structure, and a notch of the pressure groove structure facing towards the press portion is pressed against a bottom of the pressure groove structure.

12. The display panel according to claim 11, wherein the periphery of the reflective sheet is provided with a plurality of roulettes, and the pressure groove structure is formed by bending the reflective sheet along the plurality of roulettes.

13. The display panel according to claim 7, wherein the backlight module further comprises:

an optical membrane material disposed at a surface of the light guide plate away from the reflective sheet.

14. A display, comprising a display panel, the display panel comprising a display module and a backlight module, wherein the display module is stacked with the backlight module;

wherein the backlight module comprises:

a back plate, an inner surface of a periphery of which is concavely formed with a groove;

a light guide plate disposed on an inner surface of the back plate;

a reflective sheet disposed on a bottom surface of the light guide plate facing towards the back plate;

a spacer disposed between a bottom of the groove and the reflective sheet, a top surface of the spacer facing towards the reflective sheet being closer to the reflective sheet than an inner surface of the back plate, so that a gap is formed between the reflective sheet and the back plate; and a rubber frame disposed at a top surface of a periphery of the light guide plate; wherein a periphery of the reflective sheet extends beyond the periphery of the light guide plate along a first direction, the rubber frame has a press portion that protrudes and extends towards the periphery of the reflective sheet, and an end of the press portion is pressed against the periphery of the reflective sheet.

15. The display according to claim 14, wherein there is a difference between a thickness of the spacer in a direction of a groove depth of the groove and the groove depth, and the difference is from 0.1 mm to 0.2 mm.

16. The display according to claim 14, wherein the spacer is made of silicone or foam rubber.

17. The display according to claim 14, wherein the periphery of the reflective sheet is bent towards the back plate to form a pressure groove structure, and a notch of the pressure groove structure facing towards the press portion is pressed against a bottom of the pressure groove structure.

* * * * *